United States Patent [19]
Shah et al.

[11] Patent Number: 5,346,129
[45] Date of Patent: Sep. 13, 1994

[54] INDOOR CLIMATE CONTROLLER SYSTEM ADJUSTING BOTH DRY-BULB TEMPERATURE AND WET-BULB OR DEW POINT TEMPERATURE IN THE ENCLOSURE

[75] Inventors: Dipak J. Shah, Eden Prairie; James H. Krueger, Plymouth; Rolf L. Strand, Crystal, all of Minn.

[73] Assignee: Honeywell Inc., Minneapolis, Minn.

[21] Appl. No.: 61,516

[22] Filed: May 17, 1993

[51] Int. Cl.⁵ .............................................. B01F 3/02
[52] U.S. Cl. ................ 236/44 C; 62/176.6; 165/20
[58] Field of Search ............ 62/176.6; 236/44 C, 236/44 A, 44 E; 165/20, 21

[56] References Cited
U.S. PATENT DOCUMENTS

| | | | |
|---|---|---|---|
| 4,105,063 | 8/1978 | Bergt | 165/21 |
| 4,312,189 | 1/1982 | Cotton, Jr. | 62/176 C |
| 4,841,733 | 6/1989 | Dussault et al. | 62/93 |
| 4,889,280 | 12/1989 | Grald et al. | 236/44 C |
| 5,024,265 | 6/1991 | Buchholz et al. | 165/22 |

*Primary Examiner*—William E. Wayner
*Attorney, Agent, or Firm*—Edward Schwarz

[57] ABSTRACT

A controller for a climate control system has a humidity (wet-bulb or dew point) temperature sensor as well as a dry-bulb temperature sensor within the enclosure. The humidity temperature value is used in connection with the dry-bulb temperature to generate a single error signal which is a function of both the dry-bulb and the humidity temperature values. This permits control of both enclosure temperature and enclosure humidity without abnormal cycling of the climate control system. Instead of using a sensor which directly measures the humidity temperature, the humidity temperature can be synthesized from the relative humidity and dry-bulb temperature within the enclosure.

9 Claims, 2 Drawing Sheets

INDOOR CLIMATE CONTROLLER SYSTEM ADJUSTING BOTH DRY-BULB TEMPERATURE AND WET-BULB OR DEW POINT TEMPERATURE IN THE ENCLOSURE

BACKGROUND OF THE INVENTION

This invention is directed generally to control of indoor climate modifying apparatus such as an air conditioning unit or a furnace for maintaining comfort for the occupants of enclosures. The more important application is in controlling operation of air conditioners, and the discussion and disclosure following will be based primarily on the air conditioning case. The invention will typically be implemented in an electronic thermostat which uses a microcontroller in conjunction with a temperature sensor for controlling opening and closing of a solid state switch which controls the flow of operating current to the air conditioning control module.

Thermostats typically in use now which direct operation of air conditioners use dry-bulb temperature as the controlled variable. By the term "dry-bulb temperature" is meant the actual temperature of the air as measured by a typical thermometer, and the use of the term "temperature" or "air temperature" hereafter will refer to dry-bulb temperature unless the context clearly directs otherwise. It is easy to measure air temperature and this measurement is already available in most thermostats. A typical thermostat in air conditioning mode causes the air conditioning to begin operating when temperature rises above a set point value. The air conditioner responds by injecting cold air into the enclosure until the temperature within the enclosure has fallen to a point below the set point value. The typical thermostat uses an anticipation element so as to turn off the air conditioning before the actual set point is reached. For many situations this type of control results in air which is comfortable for the enclosure's occupants.

It is well known that an air conditioner removes humidity from the air as well as cools it. The mechanism by which humidity is removed involves passing air from the enclosure or from the outside through the air conditioner, reducing the temperature of this air to substantially less than the comfort range of 70°-74° F. In order to remove humidity from the air, the temperature of at least some of it must be lowered to less than the current dew point temperature, the temperature at which water condenses from the air. Some of the water in the conditioned air condenses on the cooling coils of the air conditioner in this process and drips off the coils to a pan below, from which it drains. Because air will not release any of its humidity until it has reached 100% relative humidity, i.e., its dew point temperature, it is necessary for at least the air adjacent the cooled surfaces of the heat exchanger to reach this temperature. The total air stream through the air conditioner however, may not reach 100% relative humidity because not all of the air is cooled to its dew point. The relatively cold and dry conditioned air (relatively dry even though it has nearly 100% relative humidity) is mixed with the uncomfortably warm and humid air within the enclosure to achieve a more acceptable 40–60% relative humidity at a comfortable temperature of 70°-75° F. as well controlled by the thermostat.

Normally this procedure results in air within the enclosure whose humidity is within the comfort range. However, there are situations that can result in air having humidity which is still too high when the temperature requirement has been met. To achieve air at comfortable levels of both temperature and humidity, an air conditioner is sized for the expected load which the enclosure will present so that when the set point temperature is reached, humidity is acceptable. But in cases of unusually high humidity or where the air conditioner capacity relative to the current environmental conditions does not result in sufficient dehumidification when the set point temperature is reached, it is possible for the air in the enclosure to have excessive humidity.

It seems to be a simple solution to control the relative humidity in the enclosure by simply adding a relative humidity sensor to the thermostat, and then controlling the air conditioner to hold relative humidity within a selected set point range. A problem with this approach is that the relative humidity of the enclosure air may actually rise as the air is cooled and dehumidified within the enclosure. This possibility arises because the relative humidity is a function of both the amount of water vapor in a given volume or mass of air and its dry-bulb temperature. Relative humidity for any volume of air is defined as the ratio of the partial pressure of the water vapor in the air to the vapor pressure of saturated steam at that temperature. Since the vapor pressure of saturated steam drops rapidly with temperature, a relatively small amount of water vapor in a volume of air at a lower temperature can result in 100% relative humidity. It is thus possible to have a runaway situation where the humidity control function in the thermostat continues to call for further dehumidification, and as the temperature within the enclosure falls, relative humidity rises and locks the air conditioning on.

U.S. Pat. No. 4,105,063 (Bergt) is related art which discloses an air conditioning system which controls the dew-point temperature of enclosure air independently of the dry-bulb temperature. Bergt provides a sensor responsive to absolute moisture content which operates in parallel with the normal dry-bulb temperature control. Because of the parallel operation of the two control functions, undesirably short cycles are possible. This over-cycling problem is solved by the present invention. Bergt's invention may also require reheat which reduces the efficiency of the process.

U.S. Pat. No. 4,889,280 (Grald and MacArthur) is related art disclosing an auctioneering controller wherein the predetermined dry-bulb temperature set point is modified in response to a absolute humidity error signal. The enclosure temperature which results may not always be comfortable, and there is also a potential for over-cycling.

BRIEF DESCRIPTION OF THE INVENTION

These and other shortcomings of the referenced patents are solved by the present invention which computes an error value as a function of both the dry-bulb temperature and the dew point or wet-bulb temperature. This error value is then used as the input to a temperature control algorithm used by a controller for a climate control system to determine the times during which to activate the climate control system for modifying the temperature and humidity of air within an enclosure.

Such a controller includes a humidity sensor providing a humidity temperature signal encoding at least one of the wet-bulb temperature and the dew point temperature and a temperature sensor providing an air temperature signal encoding the dry-bulb temperature value. A memory records a dry-bulb temperature set point value and a humidity temperature set point value, and providing a set point signal encoding the dry-bulb and humidity temperatures set point values. A comparison means receives the humidity and air temperature signals and the set point signal, and computes an error value as a function of the values encoded in the humidity and air temperature signals and the set point signal, and issues a demand signal responsive to a predetermined range of error values. In a typical arrangement, the demand signal is supplied to the climate control system. While the demand signal is present, the climate control system operates to reduce the error value by cooling or heating the enclosure air and decreasing or increasing its humidity so as to shift the enclosure's humidity and dry-bulb temperatures closer to their respective set point values.

In a preferred embodiment, a set point value is selected for each of the dry-bulb temperature and the humidity temperature. The error value is set equal to the larger of these two differences. The controller issues the demand signal when the error value exceeds a predetermined value.

DESCRIPTION OF THE PREFERRED EMBODIMENTS

Figure 1:
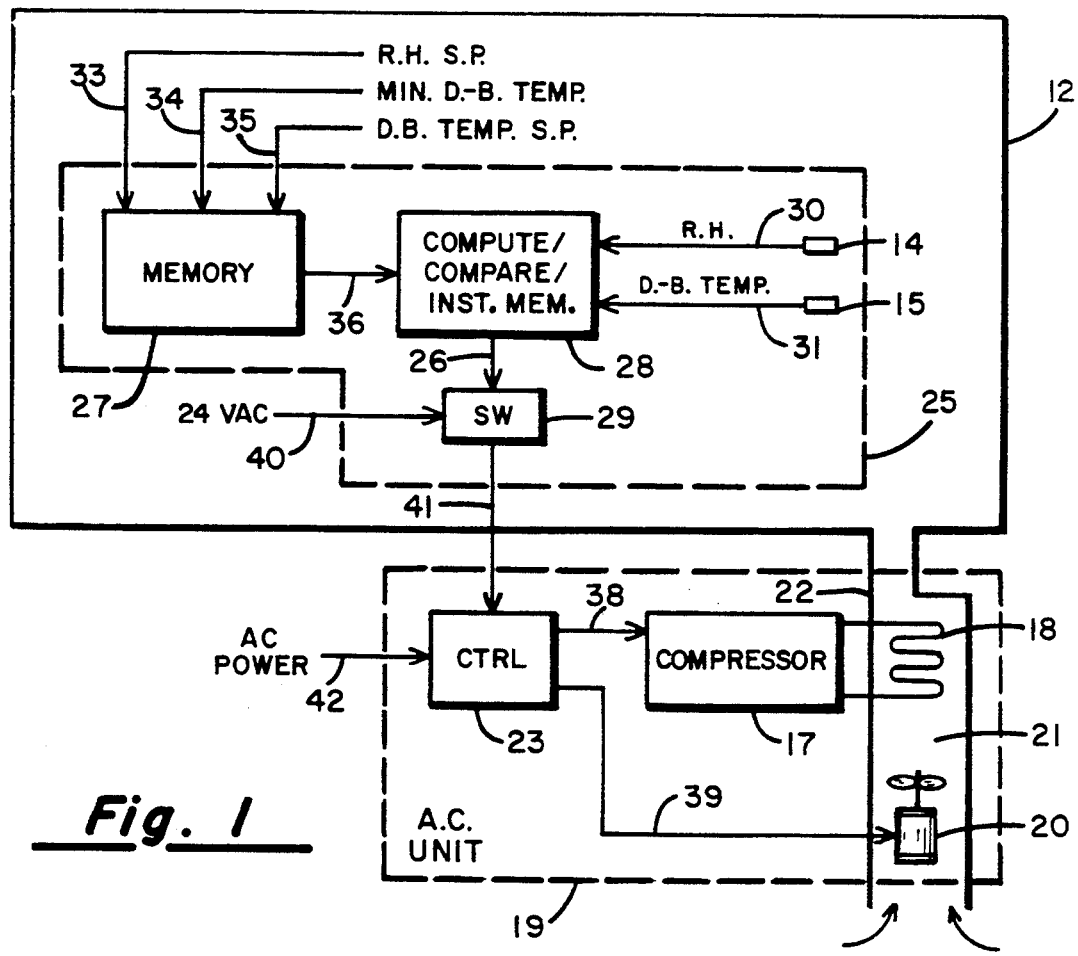
FIG. 1 is a block diagram of complete air conditioning installation employing the invention.

In FIG. 1, the invention is shown implemented in a controller 25 for an air conditioning installation. An enclosure 12 receives cooled and dehumidified air from a conventional air conditioning unit 19 which operates on externally supplied AC power provided on conductors 42. A control element 23 switches power to a compressor 17 and a blower 20 on conductors 38 and 39 respectively, thereby providing sequencing as needed for their operation. Compressor 17 provides liquid coolant to expander coil 18 which is located in a heat exchanger plenum 21 along with the blower 20. The air conditioning unit 19 operates while a demand signal is present on path 26. The demand signal on path 26 closes switch 29, allowing control current supplied by a 24 VAC source on path 40 to flow to the air conditioning unit controller 23 on path 41. While air conditioning unit 19 is operating, fan 20 forces air across coil 18 to cool and dehumidify the air. This conditioned air flows into enclosure 12 through duct 22 to reduce both the temperature and humidity of the air within enclosure 12. The demand signal on path 26 is provided by a controller 25 whose functions occur within electronic circuitry. We expect that controller 25 will typically be attached to a wall of enclosure 12 in the manner done for conventional thermostats.

Controller 25 includes a memory unit 27 which can store digital data and a processor unit 28 which can perform computation and comparison operations on data supplied to it from both memory 27 and from external sources, and which also includes an instruction memory element. We prefer to use a conventional microcontroller to function as memory 27 and processor 28. Controller 25 further comprises a humidity sensor 14 located within enclosure 12 and which provides a humidity signal on path 30 which is shown as encoding the relative humidity of the air within enclosure 12, but alternatively may encode the dew point temperature or the wet-bulb temperature of this air. A temperature sensor 15 also located within enclosure 12 similarly encodes a dry-bulb temperature value in an air temperature signal on path 31. Processor 28 receives these temperature signals and converts them to digital values for internal operations.

Paths 33–35 carry signals to memory 27 encoding various set point values necessary for implementing this invention. Typically the signals on paths 33–35 are provided by the person responsible for controlling the climate of enclosure 12. If this person is an occupant of enclosure 12, the set point values may be selected by simply shifting control levers or dials carried on the exterior of controller 25. The values may also be selected by a keypad which provides digital values for the set points in the signals on paths 33–35. Path 33 carries a humidity signal encoding a humidity set point value representative of the desired relative humidity within the enclosure 12. This humidity set point value may be actual desired relative humidity, or the desired dew point temperature, or even the desired wet-bulb temperature. Path 34 carries to memory 27 a signal encoding an externally provided minimum dry-bulb temperature set point value which serves as a limit value for dry bulb temperature. Path 34 carries to memory 27 a signal encoding a minimum air (dry-bulb) temperature set point value. Path 35 carries a signal encoding an air (dry-bulb) temperature set point value. Memory 27 records these three set point values, and encodes them in a set point signal carried to processor 28 on a path 36. If memory 27 and processor 28 are formed of a conventional microcontroller, the procedures by which these set point values are provided to processor 28 when needed are included in further circuitry not shown which provides a conventional control function for the overall operation of such a microcontroller.

Figure 2:
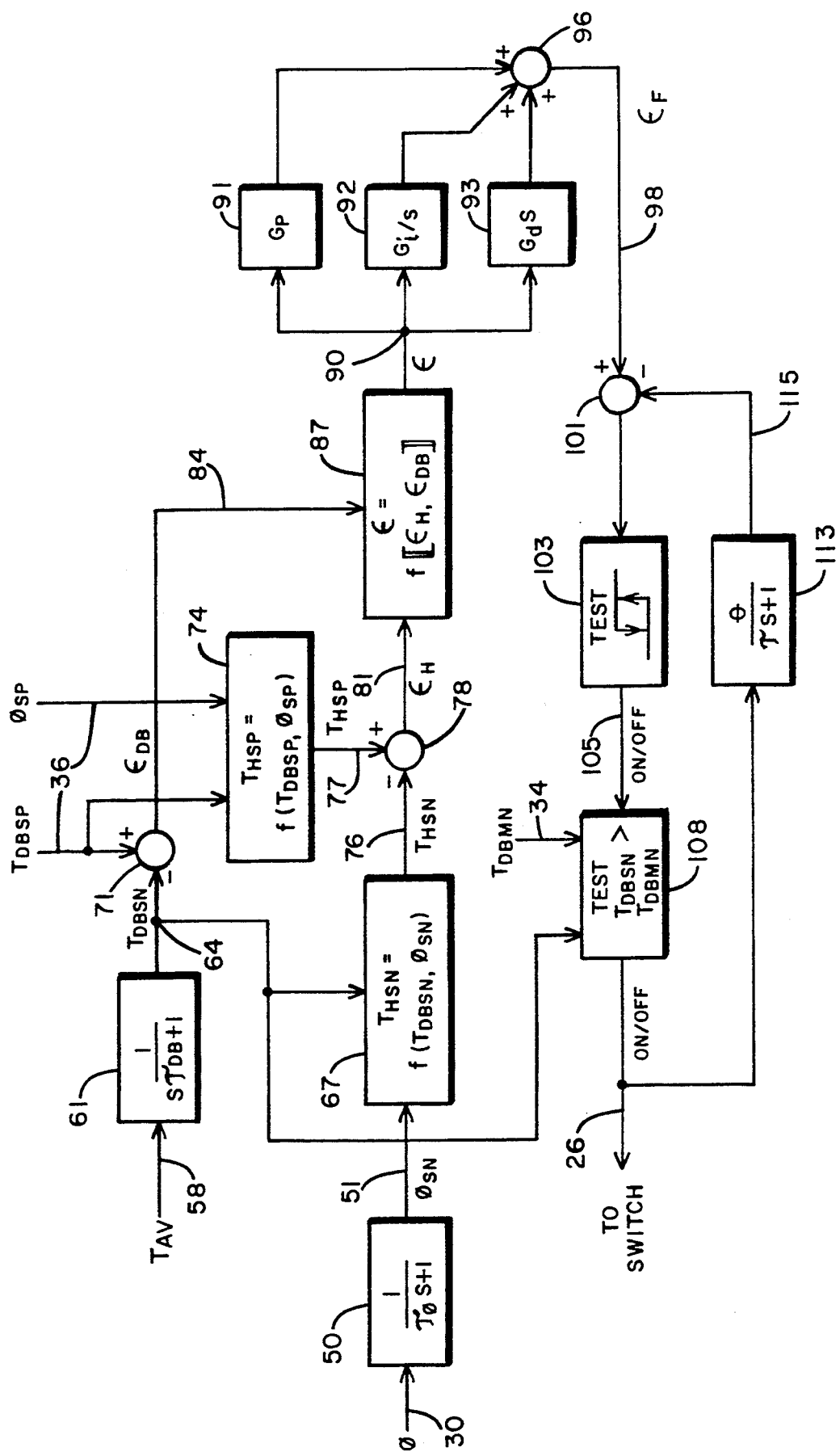
FIG. 2 is a computation diagram specifying a preferred embodiment of the algorithm implemented by a controller for a climate control system.

While the structure of controller 25 as shown in FIG. 1 is completely correct, it is incomplete in that there is no description of the operations which the microcontroller performs in implementing the invention. Processor unit 28 has internal to it, a read-only memory (ROM) in which are prestored a sequence of instructions which are executed by processor unit 28. The execution of these instructions results in processor unit 28 performing the functions shown in detail by the functional block diagram of FIG. 2. FIG. 2 is much more useful to the reader than is FIG. 1 in understanding both the invention itself as well as the structure which a preferred embodiment has. The reader should understand that FIG. 2 represents and explains modifications to the hardware broadly shown in FIG. 1, which modifications allow processor unit 28 to implement our invention. We wish to emphasize that each element of FIG. 2 has an actual physical embodiment within processor unit 28. This physical embodiment arises from the actual physical presence of structure within processor unit 28 which provide the functions of the various elements and data paths shown in FIG. 2. The execution of each instruction causes the processor unit 28 to physically become part of an element shown in FIG. 2 while the instruction is executed. The ROM within processor unit 28 also forms a part of each of the functional blocks in FIG. 2 by virtue of it storing and supplying the instructions which cause the creation of the functional blocks. There are also arithmetic operation registers within processor unit 28 which temporarily store the results of computations. These can be considered to form a part of memory 27 even though perhaps physically located within the processor unit portion of the microcontroller.

Signal transmissions are represented in FIG. 2 by lines originating from one functional block and terminating at another as shown by the arrow. This implies that signals created by one function element are supplied to another for use. Within a microcontroller, this occurs when a series of instructions whose execution causes the microcontroller to comprise one functional element, actually produces digital values which are then transmitted within the microcontroller on its signal paths for use by the circuitry when executing instructions for another functional element. It is entirely possible that the same physical signal paths within a microcontroller will carry many different signals each whose paths are shown individually in FIG. 2. In fact, one can think of a single such physical path as being time shared by the various functional blocks. That is, such an internal path of a microcontroller may at different times, perhaps only microseconds apart, serve as any one of the various paths shown in FIG. 2.

At this point, it is helpful to supply a legend which tabularly defines each value encoded in the signals shown in FIG. 2:

$T_{AV}$ - Weighted average temperature of enclosure 12
$\phi$ - Enclosure 12 relative humidity
$T_{DBSN}$ - Sensor-derived dry-bulb temperature of the air in enclosure 12 with lag corrections
$T_{DBSP}$ - Dry-bulb temperature set point for enclosure 12
$\phi_{SP}$ - Relative humidity set point for enclosure 12
$\phi_{SN}$ - Sensor-derived relative humidity in enclosure 12 with lag corrections
$\epsilon_{DB}$ - Dry-bulb temperature error
$T_{HSN}$ - Sensed humidity temperature in enclosure 12
$T_{HSP}$ - Calculated humidity temperature set point for enclosure 12
$\epsilon_H$ - Humidity temperature error
$T_{DBMN}$ - Minimum allowable value for $T_{DBSN}$
$\epsilon_f$ - Final error value provided by P-I-D function In FIG. 2, the individual functional blocks have internal labels which describe the individual functions which each represent. Established conventions are followed in FIG. 2 to represent the various functions which comprise the invention. Each rectangular block, say block 61, represents some type of mathematical or computational operation on the value encoded in the signal supplied to the block. Thus, the signal on path 58, which encodes the average room temperature $T_{AV}$, is shown supplied to functional block 61, to collectively represent apparatus which forms a Laplace operator transform $T_{AV}$. Other functional blocks represent decision operations, calculation of other mathematical functions, such as multiplication, and other Laplace transform operations of various types. Circles to which are supplied two or more signals imply a sum or difference calculation as indicated by the adjacent plus or minus sign. Thus the plus and minus signs adjacent the junctions of paths 35 and 64 with summation element 71 implies subtraction of the value encoded in the signal on paths 64 from the value encoded on path 35.

The various calculations, operations, and decisions represented by FIG. 2 are performed in the sequence indicated at regular intervals, typically either each minute or continuously. If calculations proceed continuously, then it is necessary to determine the time which elapses from one completion to the next in order to determine the rates of change of various values where this is important to the operation. Since temperatures and humidities within an enclosure 12 usually change very slowly, a once per minute calculation usually provides more than adequate accuracy of control.

Block 61 receives a signal on path 58 encoding a value which represents a weighted average of the wall temperature and the air temperature in enclosure 12 $T_{AV}$. Block 61 represents a Laplace transform operation on $T_{AV}$ intended to compensate for sensor response lag, and produces a signal on path 64 encoding $T_{DBSN}$. The computation of $T_{DBSN}$ is conventional. The $T_{DBSN}$ value on path 64 is subtracted from $T_{DBSP}$ encoded in the signal on path 35 to produce the dry-bulb temperature error value $\epsilon_{DB}$, which is the conventional error used to control air conditioners and furnaces. $\epsilon_{DB}$ is encoded in the signal on path 84.

The advance which this invention provides is the use of humidity as a further variable for computing the error used for controlling operation of the air conditioning unit 19 shown in FIG. 1. To accomplish this, our preferred apparatus uses a relative humidity value $\phi$ encoded in a signal from sensor 14 supplied on path 30. The $\phi$ value is supplied to a Laplace transform operation block 50 which compensates for the lag and instability in sensor 14, and provides a transformed relative humidity value $\phi_{SN}$ on path 51.

It is well known to determine both wet-bulb and dew point temperatures (either of which are hereafter collectively referred to as a humidity temperature) from a given dry-bulb temperature and a given relative humidity value. This is simply the digital or computational equivalent of manually looking up a value in a standard psychrometric chart. We note that wet-bulb temperature and dew point temperature are very close to each other for most combinations of dry-bulb temperature and relative humidity, and for this invention can be used interchangeably. Computation block 67 receives $\phi_{SN}$ and $T_{DBSN}$ and computes from these values an approximation of one of the humidity temperatures $T_{HSN}$, and encodes this value in the signal on path 76. One can consider block 67 as forming a part of the humidity sensor 14 which together comprise a composite sensor providing a humidity temperature value $T_{HSN}$.

Computation block 74 performs a similar computation to derive an approximation for the humidity temperature set point $T_{HSP}$ from the dry-bulb temperature set point and the relative humidity set point. In fact, it is likely that the same instructions within the processor 26 memory will serve to make both computations at different times, these instructions forming a subroutine which is called at the appropriate time and supplied with the relevant relative humidity value and dry-bulb temperature. Block 74 receives the $T_{DBSP}$ value on path 35 and the $\phi_{SP}$ value on path 33 and encodes the corresponding set point humidity temperature $T_{HSP}$ value in a signal on path 77. Block 74 can be considered as including a memory element which briefly stores $T_{HSP}$ at the end of the calculation. Summing block 78 receives the $T_{HSP}$ and $T_{HSN}$ values on paths 77 and 76 respectively, and forms the error value $\epsilon_H = T_{HSP} - T_{HSN}$ which is encoded in a signal carried on path 81. The individual signals on paths 81 and 84 encoding $\epsilon_H$ and $\epsilon_{DB}$ can be considered as collectively forming a first or initial error signal.

Figure 3:
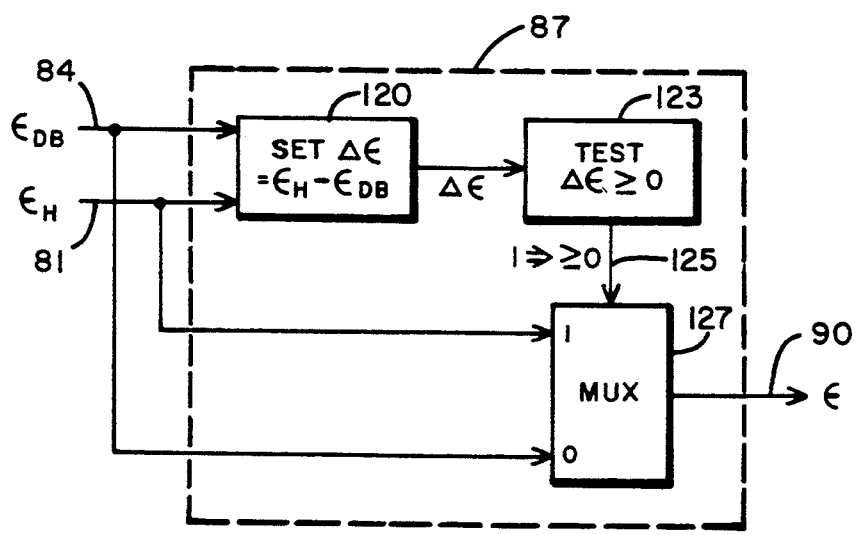
FIG. 3 is a diagram which discloses a preferred embodiment of the element which form a composite error value.

Computation block 87 uses the dry bulb temperature error $\epsilon_{DB}$ and the humidity temperature error $\epsilon_H$ to derive a second level or composite error value e which is encoded in the signal carried on path 90. (The term "computation" is used here in a broad sense to include any sort of data manipulation.) There are a number of different algorithms by which the composite error value can be derived. The algorithm which we currently prefer is to simply set $\epsilon$ to the larger of $\epsilon_{DB}$ and $\epsilon_H$ and this is what is implied by the dual stroke brackets shown in the function which labels computation block 87. FIG. 3, which shows one implementation of apparatus for selecting the larger of $\epsilon_H$ and $\epsilon_{Dp}$, is explained below.

It is not preferred to use the composite error value $\epsilon$ directly for deriving a demand signal. Instead e is provided to a conventional. PID (proportional, integral, derivative) control function comprising the $G_p$, $G_i/s$ and $G_d s$ blocks 91-93 whose output values are then summed by a summing block 96 (also a part of the PID control function) to produce a final error value $\epsilon_F$ encoded in a final error signal on path 98.

The final error value $\epsilon_F$ carried on path 98 is converted to the demand signal on path 26. $\epsilon_F$ is preferably modified through a number of computational stages according to known practice to insert an anticipation function in deriving the final demand signal on path 26. Each stage of the demand signal computation produces a signal having a logical 1 voltage level, which can be thought of as corresponding to the ON condition of air conditioning unit 19. The signal voltage on path 26 has a level corresponding to a logical 0 when the demand signal is not present. When a logical 1 is present on path 26, then switch 29 (see FIG. 1) is closed and current flows to air conditioning unit 19. When path 26 carries a logical 0 value, switch 29 is open and unit 19 does not operate.

The anticipation function is implemented in a conventional manner by the summing block 101 and functional blocks 103 and 113. Block 113 applies a Laplace transform operation $\Theta/(\tau S+1)$ in a known manner to the signal carried on path 26, shifting its logical 0 and 1 values in time. Hysteresis test block 103 provides a first stage demand signal on path 105 whose logical 1 intervals disregard the relative magnitudes of $T_{DBSN}$ and $T_{DBMN}$. If the Laplace transform block 113 returns a value of 0 on path 115 to summing block 101, then the final error value $\epsilon_F$ on path 98 is used by the hysteresis test block 103 to determine the times and lengths of the first stage of the demand signal on path 105. If block 113 returns a value different from zero to summing block 101 then the error value $\epsilon_F$ on path 98 supplied to test block 103 is reduced by summation blocks 101, which will delay the starts of the demand signal and shorten its interval length, thereby delaying startup and speeding up shutdown times of air conditioning unit 19.

One further feature of this invention is a test block 108 which receives the first stage of the demand signal on path 105. We feel that in certain rare situations of extremely high humidity or poorly sized air conditioning units, or where a relatively low value for $\phi_{SP}$ is selected, it is possible that an uncomfortably low value of sensed dry-bulb temperature $T_{DBSN}$ may result when the humidity error $\epsilon_H$ has been reduced to a level producing an $\epsilon$ value on path 90 allowing the air conditioning unit 19 to be on (i.e., run) for an extended period of time. To deal with this problem test block 108 receives the $T_{DBSN}$ value on path 64 and the $T_{DBMN}$ value on path 34. $T_{DBMN}$ is used as a limit dry-bulb temperature for halting operation of the air conditioning unit. If the condition $T_{DBMN} > T_{DBSN}$ arises, then regardless of the actual humidity in enclosure 12, the final demand signal on path 26 is dropped so as to cause air conditioning unit 19 to shut off before the humidity error $\epsilon_H$ is reduced to the level producing a value of $\epsilon$ which normally would cause this.

FIG. 3 shows one implementation for the preferred algorithm for deriving the composite error value. In FIG. 3, a difference element 120 receives $\epsilon_H$ and $\epsilon_{DB}$ on paths 81 and 84, and forms an error difference value $\Delta\epsilon = \epsilon_H - \epsilon_{DB}$. $\Delta\epsilon$ is encoded in a signal carried to a test element 123 which compares $\Delta\epsilon$ to 0. If $\Delta\epsilon \geq 0$ is true, a select signal carried on path 125 encodes a binary 1. The "=>" symbol means "implies" or "connotes", thus a binary 1 in the signal on path 125 means that the condition $\Delta\epsilon \geq 0$ has been sensed. A multiplexer 127 receives on path 125 the select signal, whose value when a binary 1 enables port 1 to gate the value $\epsilon_H$ on path 81 to the output path 90 as $\epsilon$, and when a binary 0 enables port 0, gating $\epsilon_{DB}$ on path 84 to path 90. This is only one of a number of suitable ways by which the relative magnitudes of $\epsilon_H$ and $\epsilon_{DB}$ can be used to gate the larger of the two to path 90. In a microcontroller implementation, the software reproduces the functions shown in FIG. 3 in one manner or another.

We claim:

1. Apparatus for cooperating with a controller for a climate control system for modifying the temperature and humidity of air within an enclosure, said controller activating the climate control system responsive to a composite error value encoded in a composite error signal falling within a preselected range of error values, said apparatus comprising
   a) a humidity sensor providing a humidity temperature signal encoding at least one of the wet-bulb temperature and the dew point temperature;
   b) a temperature sensor providing an air temperature signal encoding the dry-bulb temperature value;
   c) a memory recording a dry-bulb temperature set point value and a humidity temperature set point value, and providing a set point signal encoding the dry-bulb and humidity temperatures set point values; and
   d) error computation means receiving the humidity and air temperature signals and the set point signal, for computing the composite error value as a function of the values encoded in the humidity and air temperature signals and the set point signal, and for encoding the composite error value in the composite error signal.

2. The apparatus of claim 1 further comprising an error processing means receiving the composite error signal for providing a demand signal during intervals determined as a function of the composite error value.

3. The apparatus of claim 2, wherein the memory further comprises means for storing a limit dry-bulb temperature value and for providing a signal encoding the limit dry-bulb temperature value in a limit temperature signal, and wherein the error processing means further comprises comparison means receiving the limit temperature signal and the air temperature signal, for comparing the limit dry-bulb temperature with the value encoded in the air temperature signal, and for suppressing the demand signal responsive to a predetermined relationship between the limit dry-bulb temperature value and the dry-bulb temperature value.

4. The apparatus of claim 3 intended for controlling operation of a climate control system having an air conditioning function, wherein the means for storing a limit dry-bulb temperature value includes means for storing a temperature value less than the dry-bulb temperature set point value.

5. The apparatus of claim 1, wherein the humidity sensor comprises
   a) a relative humidity sensor providing a relative humidity signal encoding the value of the ambient relative humidity; and
   b) humidity temperature computation means receiving the air temperature signal and the relative humidity signal, for computing a humidity temperature approximation value, and for encoding the humidity temperature approximation value in the humidity temperature signal.

6. The apparatus of claim 5, wherein the memory further comprises means for recording a relative humidity set point value, and means receiving the relative humidity set point value and the dry-bulb temperature set point value, for computing the humidity temperature set point value as a function of the relative humidity set point value and the dry-bulb temperature set point value, and for providing a signal encoding the computed humidity temperature set point value, and wherein the memory includes means receiving the computed humidity temperature set point value signal, for recording the computed humidity temperature set point value encoded in the computed humidity temperature set point value signal.

7. The apparatus of claim 1, wherein the memory further comprises i) means for recording a relative humidity set point value, and ii) computed set point recording means for recording a computed humidity temperature set point value encoded in a computed humidity temperature set point value signal, and iii) means for encoding the computed humidity temperature set point value as the humidity temperature set point value in the set point signal; and wherein the controller further comprises computing means receiving the relative humidity set point value and the dry-bulb temperature set point value, for computing the humidity temperature set point value as a function of the relative humidity set point value and the dry-bulb temperature set point value, and for providing the signal encoding the computed humidity temperature set point value to the computed set point recording means.

8. The apparatus of claim 7, wherein the error computation means further comprises
   i) computing means for forming a humidity temperature error equal to the difference between the humidity temperature value and the humidity temperature set point value, for forming a dry-bulb temperature error equal to the difference between the dry-bulb temperature value and the dry-bulb temperature set point value, and for providing an initial error signal encoding the humidity temperature error and the dry-bulb temperature error; and
   ii) comparison means receiving the initial error signal, for sensing the relative magnitudes of the humidity temperature error and the dry-bulb temperature error and for encoding in the composite error signal, the larger of the errors encoded in the initial error signal.

9. The apparatus of claim 1, wherein the error computation means further comprises
   i) computing means for forming a humidity temperature error equal to the difference between the humidity temperature value and the humidity temperature set point value, for forming a dry-bulb temperature error equal to the difference between the dry-bulb temperature value and the dry-bulb temperature set point value, and for providing an initial error signal encoding the humidity temperature error and the dry-bulb temperature error; and
   ii) comparison means receiving the initial error signal, for sensing the relative magnitudes of the humidity temperature error and the dry-bulb temperature error and for encoding in the composite error signal, the larger of the errors encoded in the initial error signal.

* * * * *